United States Patent
Cornwall

(10) Patent No.: US 7,346,030 B2
(45) Date of Patent: Mar. 18, 2008

(54) PROCESSING GAIN FOR WIRELESS COMMUNICATION, SUCH AS IN AUTOMATIC DATA COLLECTION SYSTEMS FOR PUBLIC UTILITY DATA COLLECTION

(75) Inventor: Mark K. Cornwall, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 618 days.

(21) Appl. No.: 10/951,266

(22) Filed: Sep. 27, 2004

(65) Prior Publication Data
US 2005/0078631 A1 Apr. 14, 2005

Related U.S. Application Data

(60) Provisional application No. 60/542,254, filed on Feb. 5, 2004, provisional application No. 60/506,204, filed on Sep. 26, 2003.

(51) Int. Cl.
*H04J 3/22* (2006.01)

(52) U.S. Cl. .............. 370/330; 370/329; 370/341; 455/450; 455/509

(58) Field of Classification Search ............... 370/330, 370/465, 329, 341, 431, 436, 437, 468; 455/9, 455/67.11, 115.1–115.4, 450–452.2, 464, 455/509
See application file for complete search history.

(56) References Cited

U.S. PATENT DOCUMENTS

| | | | |
|---|---|---|---|
| 5,581,229 A | | 12/1996 | Hunt |
| 5,983,074 A | * | 11/1999 | Jansen .................. 340/7.1 |
| 6,058,355 A | * | 5/2000 | Ahmed et al. ............ 702/62 |
| 6,100,817 A | * | 8/2000 | Mason et al. ........ 340/870.02 |
| 6,154,488 A | | 11/2000 | Hunt |
| 6,163,602 A | * | 12/2000 | Hammond et al. .... 379/114.01 |
| 6,185,198 B1 | * | 2/2001 | LaDue ..................... 370/329 |
| 6,501,785 B1 | | 12/2002 | Chang |
| 6,653,945 B2 | | 11/2003 | Johnson |
| 7,202,800 B2 | * | 4/2007 | Choi ................. 340/870.02 |
| 2002/0071478 A1 | | 6/2002 | Cornwall |
| 2002/0109607 A1 | | 8/2002 | Cumeralto |
| 2003/0001754 A1 | | 1/2003 | Johnson |
| 2005/0055432 A1 | * | 3/2005 | Rodgers .................. 709/223 |
| 2007/0043849 A1 | * | 2/2007 | Lill et al. ................. 709/224 |

OTHER PUBLICATIONS

U.S. Appl. No. 10/900,993, filed Jul. 28, 2004, Itron, Inc.
U.S. Appl. No. 10/915,706, filed Aug. 10, 2004, Itron, Inc.
U.S. Appl. No. 10/929,777, filed Aug. 30, 2004, Itron, Inc.
U.S. Appl. No. 10/929,862, filed Aug. 30, 2004, Itron, Inc.
U.S. Appl. No. 10/931,945, filed Sep. 1, 2004, Itron, Inc.

* cited by examiner

*Primary Examiner*—CongVan Tran
(74) *Attorney, Agent, or Firm*—Perkins Coie LLP

(57) ABSTRACT

Several embodiments are described that increase processing gain. Under one embodiment, a wireless receiver quickly and accurately determines a particular frequency hopping table employed by a transmitter. Under another embodiment, the wireless receiver accumulates packets, such as packets containing utility meter data, and employs a mathematical process on the packets to generate an improved, decodable packet. Other embodiments are described in detail.

14 Claims, 5 Drawing Sheets

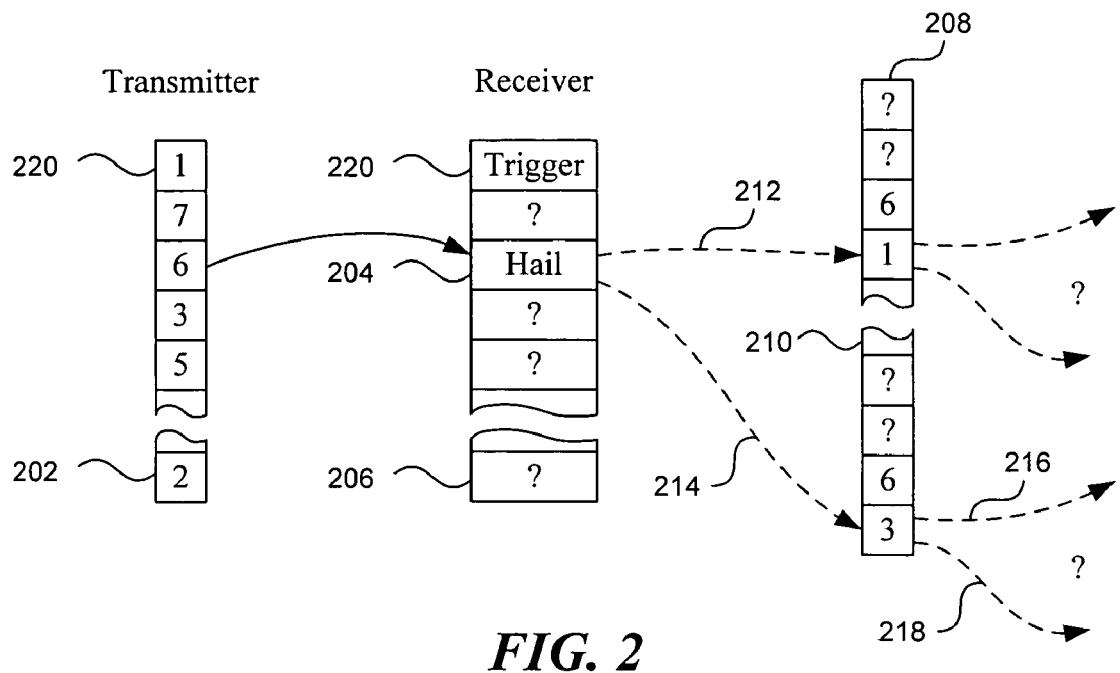
FIG. 2
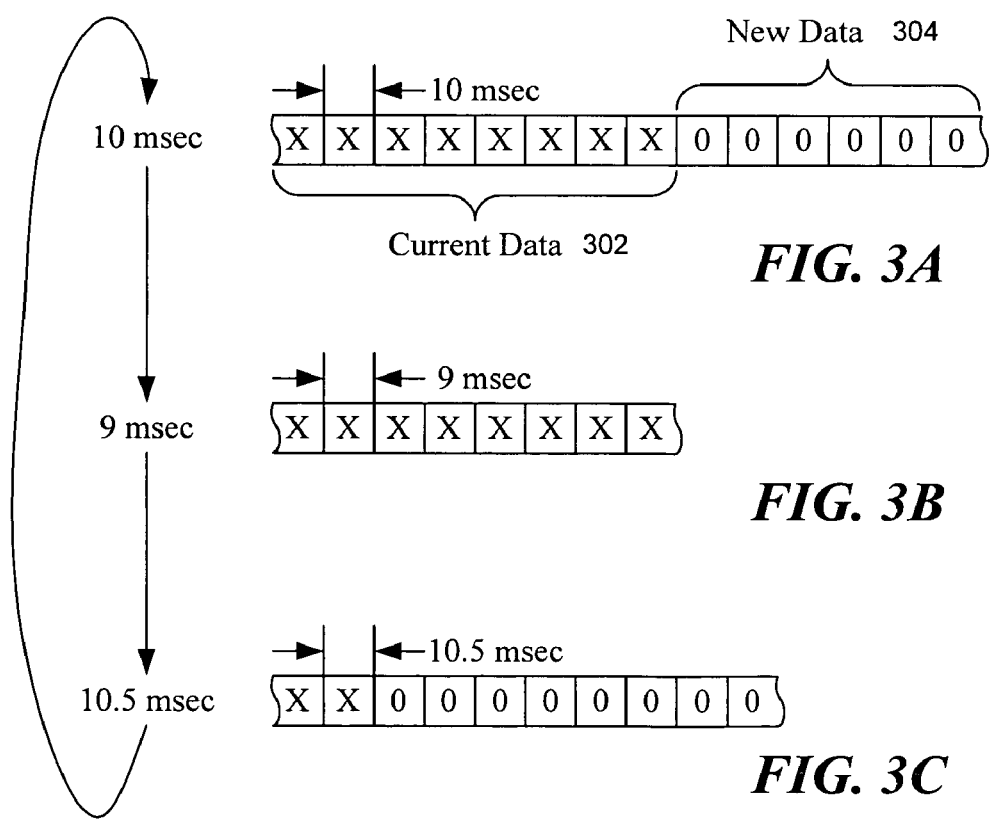
FIG. 3A
FIG. 3B
FIG. 3C

PROCESSING GAIN FOR WIRELESS COMMUNICATION, SUCH AS IN AUTOMATIC DATA COLLECTION SYSTEMS FOR PUBLIC UTILITY DATA COLLECTION

CROSS-REFERENCE TO RELATED APPLICATIONS

This application claims the benefit of U.S. Provisional Application Nos. 60/506,204, filed Sep. 26, 2003, and 60/542,254, filed Feb. 5, 2004, both assigned to the same assignee.

BACKGROUND

Data collection, such as for electric, gas, water and other utilities can be a costly and time-consuming process if performed manually. As a result, various technologies have developed to automatically gather utility consumption data using wired or wireless techniques, including automatic meter reading (AMR) systems. U.S. Pat. Nos. 5,581,229, 6,154,488 and 6,501,785, as well as published U.S. Patent Application Nos. 2002/0071478 and 2002/0109607, describe some of these systems.

Under the '0071478 application (and associated system manufactured by Itron, Inc. of Spokane, Wash.), a radio system at a meter or collection endpoint transmits eight identical packets on eight different frequencies, with a predetermined time interval between transmissions, depending upon a type of encoder receiver/transmitter (ERT). Thereafter a ten second delay is imposed, and the process repeats on eight new frequencies.

Each packet includes a preamble containing a number such as a hexadecimal number, a pseudo-random number (PN), or the like. Each packet is Manchester encoded, such that a one is represented by the bit sequence 10, while a zero is represented by the sequence 01. A reader samples a received signal at a known bit rate (e.g., a center two-thirds of each bit), and by comparing a relative difference between adjacent bits it determines a resulting bit stream, regardless of the noise floor. A correlator employed in a digital signal processor (DSP) looks for the preamble at a particular frequency, where the correlator time shifts received signals to search for a correlation. If a match is received, a distinctive signal pattern results. The system then determines whether a packet is bad based on a trailing cyclic redundancy check (CRC).

Under the '0109607 application, a powerful encoder transmitter (PET) system employs orthogonal frequency hopping tables to distinguish between endpoint nodes (e.g., meters or data collection devices). In other words, the hopping tables are not a subset pattern of each other. Under the orthogonal frequency hopping tables, each of the endpoints or transmitters under the PET system has a different pattern of hopping between the frequencies. This system provides a way to work within the guidelines of the Federal Communications Commission (FCC) Part 15.247, which requires a manufacturer who wants to increase transmit power to correspondingly require the receiver to track the frequency of the transmitter. (This rule prohibits a manufacturer from simply increasing transmit power, and distributing inexpensive receivers that simply pick up any signal on any channel.)

BRIEF DESCRIPTION OF THE DRAWINGS

FIG. 2 is a schematic diagram illustrating one frequency hopping table at a transmitter, and how a receiver determines the particular table employed by the transmitter.

FIGS. 3A through 3C are schematic diagrams illustrating a time dithering technique that may be employed under the system of FIG. 1.

Figure 1:
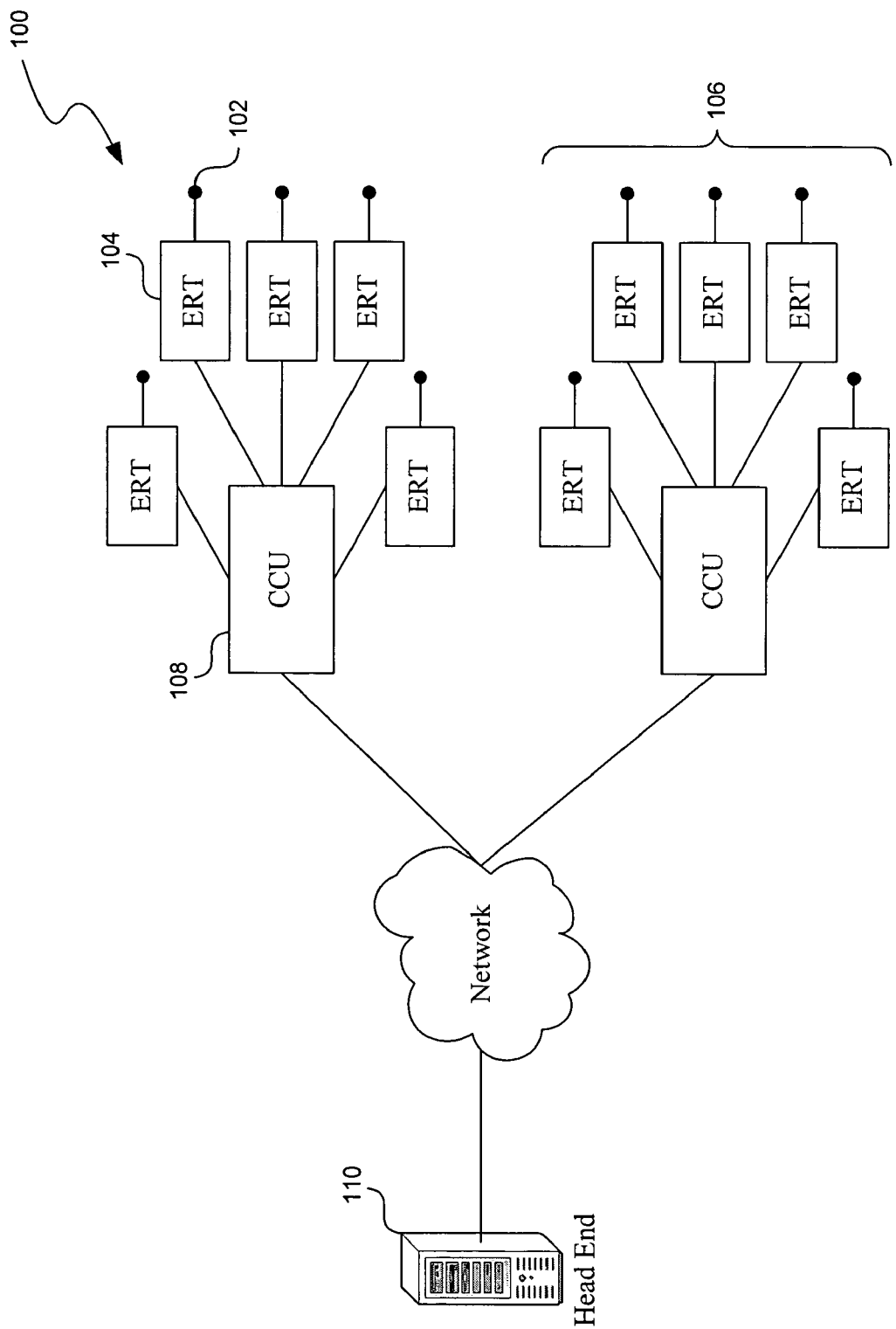
FIG. 1 is a block diagram showing an example of a system in which processing gain embodiments of the invention may be employed.

In the drawings, the same reference numbers identify identical or substantially similar elements or acts. To easily identify the discussion of any particular element or act, the most significant digit or digits in a reference number refer to the Figure number in which that element is first introduced (e.g., element 504 is first introduced and discussed with respect to FIG. 5).

The headings provided herein are for convenience only and do not necessarily affect the scope or meaning of the claimed invention.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented below be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

There are several ways of increasing processing gain or link margin between two wireless nodes. "Link margin" refers to the path loss between an endpoint and a receiver. In general, one can decrease the path loss by one of three ways: removing noise, increasing transmit power, and/or increasing receiver sensitivity. One way to take advantage of increased link margin realized with processing gain in a bubble-up AMR system is to increase system bandwidth, which can be accomplished using a wideband spectrum such as the 900 MHz industrial scientific and medical (ISM) band, although other unlicensed or licensed bands may be employed.

To use processing gain, data under the system described below is transmitted multiple times, and the reader synchronizes with the data transmissions. The processing gain provides jamming margin in a noisy environment, as well as better coverage and range in a fixed network system.

Described below are several embodiments that increase processing gain. Under one embodiment, a receiver in a frequency hopping spread spectrum system quickly and accurately determines a particular frequency hopping table a transmitter employs. Under another embodiment, a receiver accumulates bad or undecodable packets, and then employs algorithms on the accumulated packets to generate and process a good packet. Other embodiments are described in greater detail below.

In a broad sense, aspects of the invention are directed to a wireless communication method between at least one transmitting node and a receiving node. The method includes wirelessly transmitting a substantially similar message multiple times from the transmitting node. The receiving node wirelessly receives and stores at least two of the transmitting messages, and applies a mathematical operation to the received and stored messages to produce an improved signal. The receiving node then decodes at least a portion of the improved signal.

Another aspect of the invention is directed to wirelessly transmitting messages according to one of multiple different frequency hopping tables at the transmitting node. The receiving node wirelessly receives at least one of the transmitted messages on one frequency and performs a routine at least twice to determine which of the multiple different frequency hopping tables the transmitting node employs. The routine includes guessing a next frequency on which the transmitting node will next transmit a message, and listening at the next frequency for the next transmission of a message.

System Architecture

FIG. 1 and the following discussion provide a brief, general description of a suitable computing or data processing environment in which aspects of the invention can be implemented. Although not required, aspects of the invention are described in the general context of computer-executable instructions, such as routines executed by embedded systems or specially configured hardware, although a general-purpose computer, e.g., a server computer, wireless device or personal computer may be used. Those skilled in the relevant art will appreciate that the invention can be practiced with other communications, data processing or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers and the like. Indeed, the terms "computer," "host" and "host computer" are generally used interchangeably, and refer to any of the above devices and systems, as well as any data processor. Aspects of the invention can be embodied in a special purpose computer or data processor that is specifically programmed, configured or constructed to perform one or more of the computer-executable instructions explained in detail herein. Aspects of the invention can also be practiced in distributed computing environments where tasks or modules are performed by remote processing devices, which are linked through a communications network. In a distributed computing environment, program modules may be located in both local and remote memory storage devices.

Aspects of the invention may be stored or distributed on computer-readable media, including magnetically or optically readable computer discs, as microcode on semiconductor memory, nanotechnology memory, or other portable data storage medium. Indeed, computer-implemented instructions, data structures, screen displays, and other data under aspects of the invention may be distributed over the Internet or over other networks (including wireless networks), on a propagated signal on a propagation medium (e.g., electromagnetic wave(s), a sound wave(s), etc.) over a period of time, or may be provided on any analog or digital network (packet switched, circuit switched or other scheme). Those skilled in the relevant art will recognize that portions of the invention reside on a server computer, while corresponding portions reside on a client computer such as a mobile device.

Referring to FIG. 1, a suitable system 100 on which aspects of the invention may be implemented includes a meter-reading data collection system having multiple meters 102 coupled to utility-consuming devices (not shown), such as electric, gas, or water consuming devices or locations. In the illustrated embodiment, each meter 102 includes an encoder receiver/transmitter module (ERT) 104, which serves as a data collection endpoint. The ERTs 104 encode consumption, tamper information, and other data from the meters 102 and communicate such information to a CCU 108. The communication of this data may be accomplished via radio-to-radio data collection systems such as handheld, mobile automatic meter reading or fixed network. The ERTs 104 can be retrofitted to existing meters or installed on new meters during the manufacturing process. In a system for electrical metering, the ERTs 104 may be installed under the glass of new or existing electric meters 102 and are powered by electricity running to the meter. Gas and water ERTs 104 can be attached to the meter 102 and powered by long-life batteries.

As shown in FIG. 1, a group of ERTs 106 communicates with one of the CCU devices 108, which in turn feeds collected data to a head-end system 110 via periodic uploads. This may occur on an ongoing basis (e.g., every half-hour) or as otherwise needed. The CCUs 108 may be implemented as neighborhood concentrators that read the ERTs 104, process data into a variety of applications, store data temporarily, and transport data to the head-end system 110 as needed. In some embodiments, the CCUs 108 can be installed on power poles or streetlight arms (not shown).

Further details about the system of FIG. 1 and similar systems can be found in the following commonly assigned patent applications: U.S. patent application Ser. No. 09/911,840, entitled "Spread Spectrum Meter Reading System Utilizing Low-speed/High-power Frequency Hopping," filed Jul. 23, 2001; U.S. patent application Ser. No. 09/960,800, entitled "Radio Communication Network for Collecting Data From Utility Meters," filed Sep. 21, 2001; and U.S. patent application Ser. No. 10/024,977, entitled "Wide Area Communications Network for Remote Data Generating Stations," filed Dec. 19, 2001.

Tracking and Identifying Endpoints

As noted above, frequency hopping systems may require the receiver to track the hopping pattern of the transmitter. Under the PET system noted above, a number of orthogonal frequency-hopping tables are provided to distinguish between endpoints in the data collection system. Thus, each of the endpoints employ transmitters operating under a different pattern of hopping between 25 or so frequencies.

Under existing ERTs, each ERT transmits a series of packets, such as eight, each with the same message on eight different frequencies according to the specific hopping table. An ERT reader tries to read a given packet and determine the validity of a given read operation based on a succession of single reads. As noted above, a correlator in the reader finds a desirable message using a DSP correlator to find a particular preamble. The correlator can thus identify the presence of a packet from the preamble, but cannot identify which endpoint is transmitting it until the message data is decoded. If one packet is damaged by noise in the environment, the effect of the damage is reduced by other packets, as described below. As explained in alternative embodiments, endpoints can transmit more than eight packets, employ more robust preambles, or both, to achieve better system performance under existing ERTs.

As shown in FIG. 2, a node or transmitter is transmitting on a frequency hopping table 202 assigned to it. A receiver or reader is parked on a hailing channel 204, and attempts to identify a frequency hopping table that the transmitter is employing. (While only a single transmitter is shown in FIG. 2, those skilled in the relevant art will recognize that the receiver will often be attempting to simultaneously receive communications from multiple transmitters/endpoints, and thus be attempting to match received signals with multiple endpoints.) The receiver effectively constructs or employs an initial hopping table 206 to represent an initial guess at the particular hopping table employed by the transmitter. (While shown as a table, such "tables" need only be logic or data structures and code residing in the reader.) Since there are a fixed number of orthogonal hopping patterns, the reader simply stores the time and channel from which it receives a particular signal. If another correlation occurs at an allowable time later, the new frequency can be checked against good known hopping patterns stored in the reader. The reader continues this process until one of the many hopping patterns is identified, and based on this, the reader can correctly identify the endpoint, or instead distinguish one endpoint from others.

Under the example of FIG. 2, assuming that the receiver receives on the hailing channel 204 a properly correlated signal corresponding to some frequency or channel shown as "6", then in this simple example, the receiver knows from stored tables that the transmitter will then hop to either channel "1" or "3" associated with intermediate guess hopping tables 208 or 210, respectively. Thus, the receiver chooses between a decision branch 212 associated with channel 1, or a decision branch 214 associated with channel 3. If, for this example, the receiver chooses decision branch 212 and waits on channel 1 (under intermediate guess table 208), and fails to receive an appropriate signal at the appropriate time, then the receiver knows that it should have chosen decision branch 214 to intermediate guess table 210. Therefore, the receiver chooses one of two new decision branches 216 or 218 from intermediate guess table 210. The process continues until the receiver fills out or correctly establishes the hopping table employed by the transmitter.

While this example employs only two decision branches for any given channel, those skilled in the relevant art will readily recognize that more decision branches may be provided, but that ultimately the receiver will determine the appropriate hopping table given a finite set of hopping frequency tables. In general, the terms "transmitter" and "endpoint," and "receiver" and "reader" are used interchangeably herein.

Once the receiver identifies the appropriate hopping table, and thus can distinguish one endpoint from the others, the receiver waits on a trigger channel 220, which is a channel where the endpoint updates its data. (For the example of FIG. 2, the trigger channel 220 is a first channel on the hopping table, namely, channel 1 for table 202). In general, each endpoint must update its data periodically, where the new data represents new consumption data regarding a utility, in this example. To help ensure that the receiver does not process data across a data transition boundary, the receiver waits to pass this trigger channel before starting to store and integrate received packets, as explained below. While the first channel 220 is shown, any trigger channel may be employed.

As shown in FIG. 3A, packets of the same current data 302 are transmitted sequentially according to one of the hopping tables. Upon occurrence of the trigger channel 220, the endpoint updates data (e.g., utility consumption data), which is transmitted as a new series of repeated packets 304. As explained below, it is at this point that the receiver begins to accumulate or integrate packets until an endpoint message can be decoded and the endpoint identified.

Since there will ultimately be a limited number of orthogonal hopping patterns for a given set of endpoints, two or more endpoints could transmit on the same pattern. However, it is not likely they will end up transmitting at exactly the same time and on the same frequencies. But, as endpoints drift slowly in time, patterns will overlap. To mitigate this, and to provide a further differentiation between endpoints, the transmit interval may be changed slightly by employing a time dithering technique. Thus, in addition to frequency hopping tables, the transmitters may employ dithering tables that change the time interval of transmissions based on one of several unique patterns.

In other words, each transmitter in a given system employs a unique combination of one of many unique frequency hopping tables and one of many unique dithering tables, where the dithering tables define the sequence of time duration for consecutive packets. An example of such a dithering sequence is shown in FIGS. 3A through 3C. Here, the endpoint first transmits packets 10 milliseconds in duration (FIG. 3A). Thereafter (such as one second later), the endpoint begins transmitting packets 9 milliseconds in duration (FIG. 3B). Thereafter, as shown in FIG. 3C, packets 10.5 milliseconds in duration are transmitted, after which the process repeats.

The receiver, receiving a series of packets over a period of time, can measure the duration and change in packets over a sufficiently long time interval to identify the particular dithering table employed by that transmitter. For example, the receiver receiving a series of packets that are each 10 milliseconds in duration, followed by a series of packets 9 milliseconds in duration, followed by a series of packets 10.5 milliseconds in duration, and then back to a series of packets 10 milliseconds in duration will recognize that an endpoint is transmitting packets according to the dithering table depicted in FIGS. 3A through 3C.

While a series of only three consecutive time dithering changes are shown in FIGS. 3A through 3C, those skills that are relevant will readily recognize that dithering tables representing changes of only two, or four or more time changes may be employed. Based on look-up tables that distinguish a given endpoint with a particular combination of frequency hopping and dithering tables, the reader can uniquely identify that endpoint. Such a configuration may be particularly helpful in dense urban areas with multiple endpoints concentrated in a small geographical area.

While packets are shown in FIGS. 3A through 3C as adjacent, the packets in this example are not adjacent in time, but instead include gaps between them as adjacent packets are transmitted on different frequencies. Further, as described herein, a series of eight (or more) identical packets are transmitted (with a predetermined time interval therebetween), followed by a long time interval before the process is repeated.

By identifying the endpoint, without knowing its endpoint ID, the reader may, if it loses power or goes offline for any reason, quickly track and acquire endpoints in the system. Under an alternative embodiment, the reader employs a multichannel receiver that can substantially simultaneously receive signals on multiple channels (e.g., 64 channels). Thus, the reader under this alternative embodiment can effectively wait simultaneously on multiple hailing channels and more rapidly perform the above frequency tracking method. A maximum acquisition time could be two packet set times. Under the above approach, a reader can track endpoint transmissions, but not decode the packets. Indeed, the reader may choose to ignore certain endpoints and not decode their data.

Accumulating and Decoding Packets

Once the receiver has distinguished a given endpoint from others from which it is receiving signals, the receiver can begin to accumulate undecodable packets in a buffer or data store associated with that endpoint. (Once a packet is decoded, the process ends and the buffer may be flushed.) Various data structures may be employed for this buffer, such as a separate buffer for each identified endpoint, a single buffer with each received packet linked to data associating the packet with one endpoint from the others, or simply one buffer storing all messages, as described in detail below. (The terms "packets" and "messages" are generally used interchangeably herein.)

Figure 5:
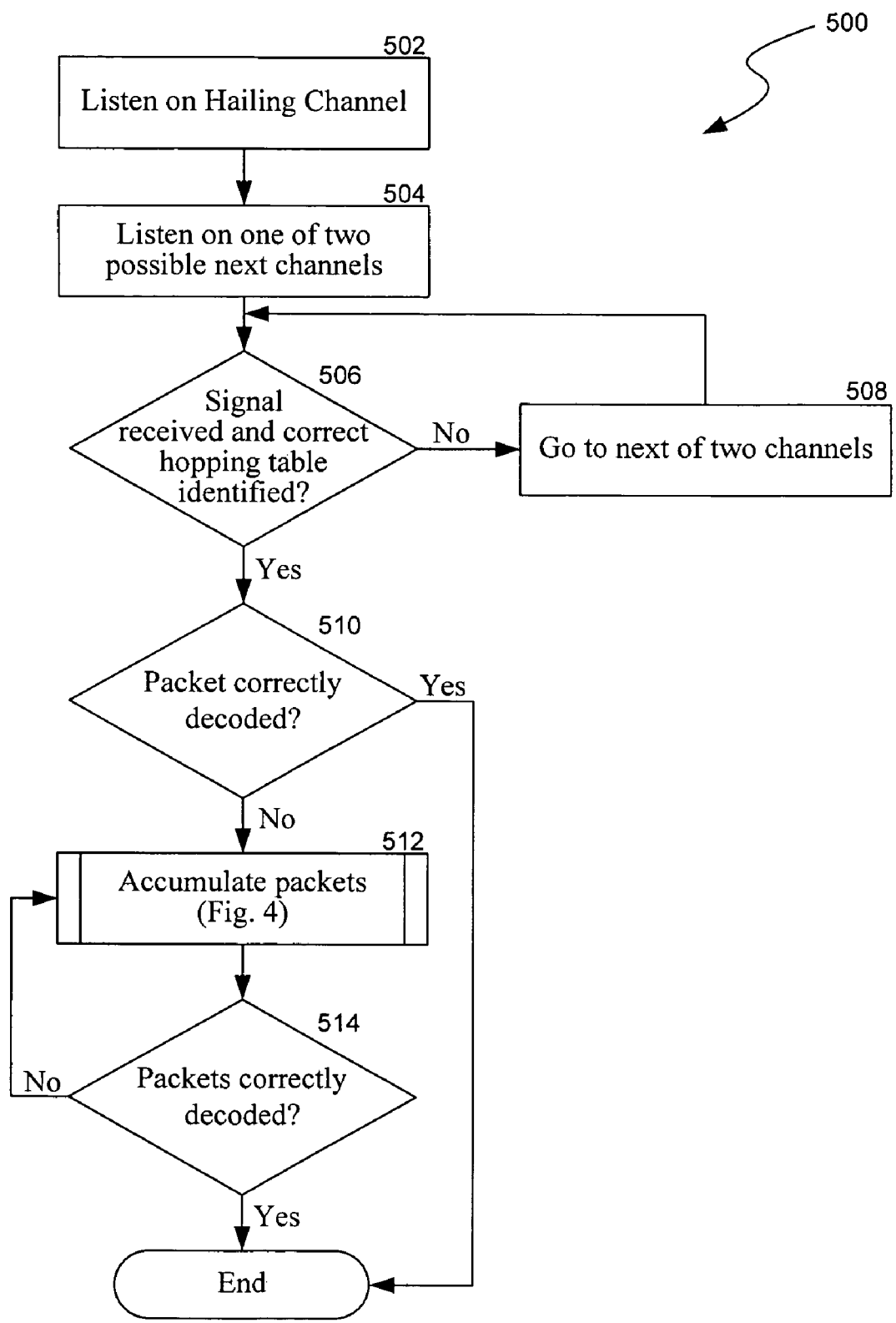
FIG. 5 is a flow diagram illustrating a process for identifying an appropriate frequency hopping table under the system of FIG. 1.

Referring to FIG. 5, a routine 500 is shown for employing these techniques. Beginning in block 502, the receiver listens on the hailing channel and attempts to identify a correlated signal. Once a correlated signal is detected, the receiver, in block 504, selects one of two decision branches and listens on one of two associated next channels, as described above. Under block 506, the receiver determines whether a signal is received on the selected channel, and attempts to identify the correct hopping table. If successful, then in block 508, the receiver determines that the transmitter had transmitted on the other of the two channels, and thus picks one of the two subsequent channels (as noted above), and the routine loops back to again perform block 506.

If the signal is properly received and the correct hopping table identified under block 506, then in block 510 the receiver determines whether the packet received can be correctly decoded. If so, then the routine ends. If not, then the receiver accumulates packets in block or routine 512, as described below. If the packets are correctly decoded in block 514, then the process ends; otherwise, the routine loops back to again perform the steps under block 512. The system, may, for example, after combining two packets and failing to decode them, store that combined packet and combine it with one or more future packets until a resulting, integrated packet is properly decoded.

Figure 6:
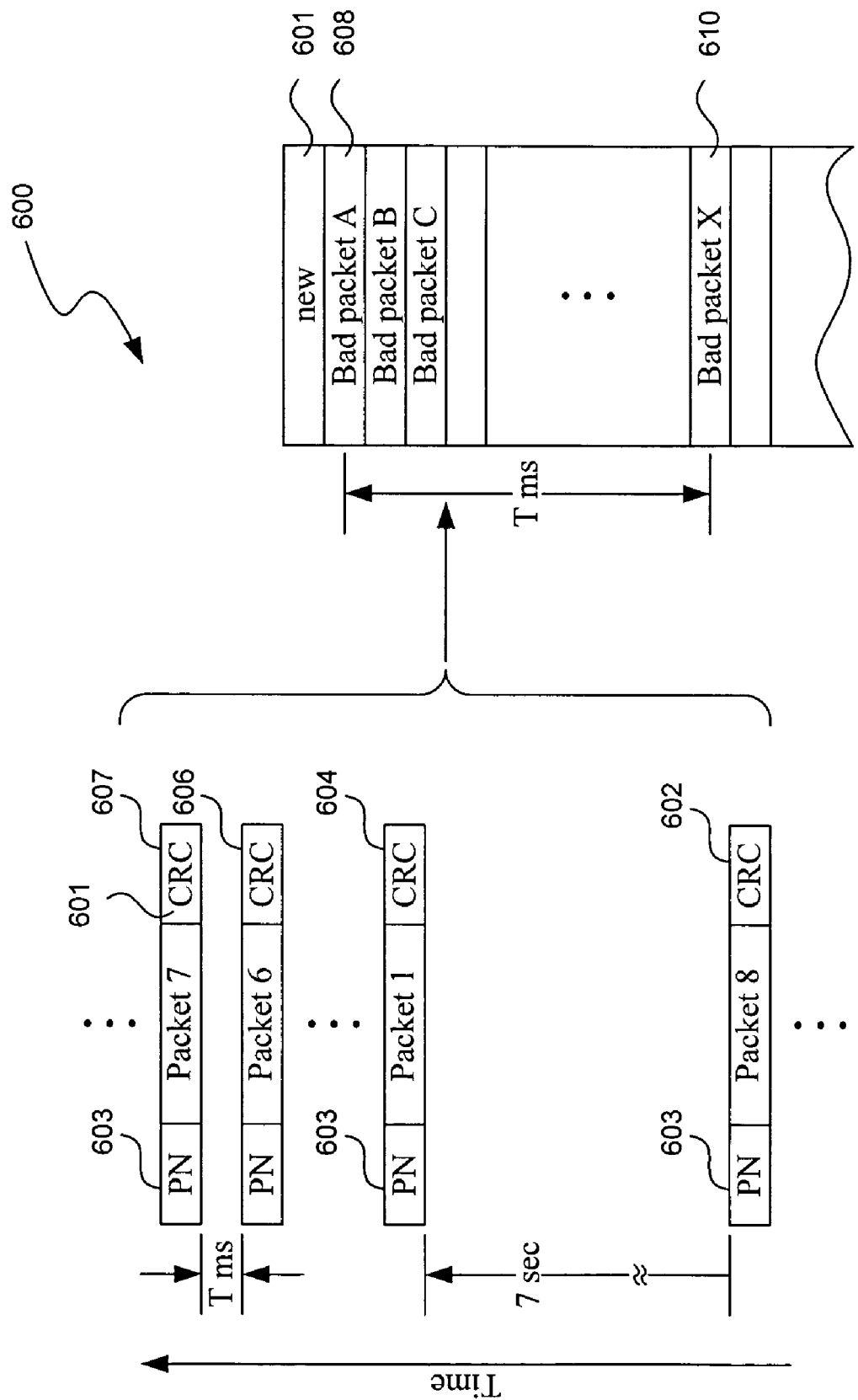
FIG. 6 is a schematic diagram illustrating a series of transmitted packets and how those packets are accumulated under the system of FIG. 1.

FIG. 6 shows an example of undecodable or "bad" packets received and accumulated by the receiver. In this example, the receiver maintains a buffer 600. Each new undecodable packet is added to the top of the buffer in a new slot 601. Each stored packet may be stored with a time stamp, as well as additional information such as signal strength, associated hopping pattern, average number of packets ultimately needed to decode the packet, and so forth.

The endpoint transmits eight identical packets, each on a different frequency according to a hopping table to reduce the probability of a collision with other endpoints. As noted above, synchronization to these packets can be accomplished at the receiver by using a correlator to detect a preamble. A received packet is considered good if it can be decoded and a checksum CRC 601 at the end of the packet correctly matches. If the packet cannot be decoded by reason of an invalid CRC calculation, then the raw analog output is stored in the buffer 600 for use in subsequent calculations. The receiver also stores a time stamp associated with each packet. Alternatively, each packet may include some indication of time, or the data structure established for the buffer 600 may provide some time data associated with stored packets.

Each packet includes a preamble 603, which in the above example is a particular hexadecimal number. Alternatively, or additionally, the preamble may be or include a pseudorandom number (PN), or known string of bits. As noted above, the preamble of each packet is used by the receiver to identify valid transmissions from other received signals or interferers. Further, the preamble 603 may include an endpoint ID to differentiate one endpoint from another (although such an ID may be included in a body of the packet, or in other leading fields within a given packet).

As shown, a grouped series of eight packets ends with a "Packet 8" 602 after which the endpoint waits seven seconds before again transmitting a group of packets, beginning with a "Packet 1" 604, and continuing through with depicted "Packet 6" and "Packet 7" (shown as packets 606 and 607, respectively). Each of the eight packets in a group is transmitted a predetermined time interval T apart (e.g., a set interval between 50-200 milliseconds). When the receiver receives and stores a bad packet, it then compares it to previously stored packets to identify any packet received T milliseconds before. If such a prior packet exists, the new and the T millisecond prior packets are summed or integrated together. In the example of FIG. 6, the receiver recognizes that a newly received and stored bad packet 608 likely relates with a previously stored bad packet 610 that bears a time stamp T milliseconds earlier, and thus the receiver combines these two packets. The receiver then attempts to decode the combined packet, and if the combined packet can still not be decoded, the process repeats.

Figure 4:
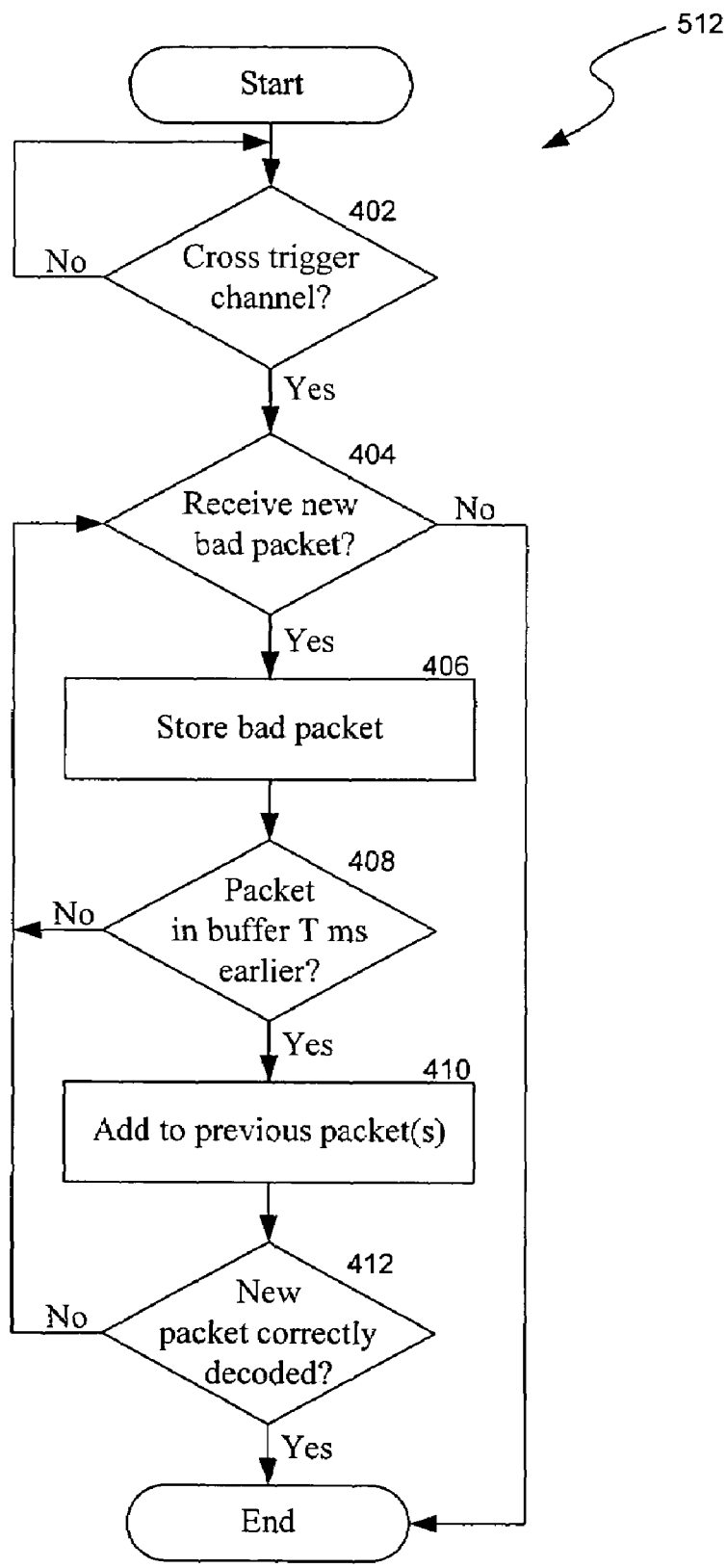
FIG. 4 is a flow diagram illustrating a method of accumulating and decoding packets under the technique of FIG. 6.

Referring to FIG. 4, the routine 512 performed by the receiver is shown for accumulating and decoding packets. Beginning in block 402, the receiver determines whether the trigger channel has been crossed (as explained above). If so, then in block 404, the receiver determines whether a new bad packet is received. If not, the process ends. Otherwise, in block 406, the receiver stores the bad packet. In block 408, the receiver determines whether a previously stored bad packet exists in the buffer that is T milliseconds before the newly stored packet. In other words, the receiver determines whether two packets are associated with a T millisecond time difference. If so, then the two packets are added or integrated together under block 410. In block 412, the receiver attempts to correctly decode the newly combined packets, and if successful, the routine ends. Otherwise, if no prior packet existed under block 408, or the packet could not be correctly decoded in block 412, the routine loops back to block 404.

While the receiver adds or integrates packets together, the receiver may alternatively, or additionally, perform additional algorithms or processing with respect to the packets. For example, the receiver may average packets, or perform certain filtering on the packets in an attempt to further obtain a resulting decodable packet. Also, while a predetermined T millisecond difference is discussed, other known or algorithmically determined time intervals may be recognized or employed.

Adding packets together provides an improvement in receiver sensitivity. An up to 10 dB gain can be realized if each endpoint had an extended preamble of 100 bits. Further, if the endpoint transmitted 100 identical packets, then integrating or adding all packets together would realize an additional 10 dB gain in reader sensitivity. Such a gain also provides a margin against jamming from in-band interferers, such as direct sequence spread spectrum transmitters. The receiver simply integrates up all 100 messages, and CRC calculations would be performed after each new message is integrated with prior messages. If the CRC calculation yields a good packet, then integration ceases and the next set of 100 packets received. This approach can be used for any number of identical messages.

If 5 dB of processing gain is required, then only 10 identical packets need be transmitted, and the preamble would need to be only 10 bits long.

An example of a system with endpoints transmitting every 7 seconds is that of FIG. 6, but with 100, rather than 8, packets in a group. (Of course, even a signal packet may be sent at a time under this embodiment.) The receiver requires 700 seconds to receive and integrate a single packet with full processing gain. Since an endpoint does not update its consumption for 100 packets, the read latency in this embodiment is 700 seconds, or a reading every 12 minutes. The endpoints may be reprogrammed to change consumption data every 100 packets, under this example. If the endpoint hops in frequency, a particular frequency channel would coincide with a new packet sequence. As a result, the reader simply starts packet integration at the start of the sequence, as noted above with respect to identifying the trigger channel.

Such an approach may work well with mobile and handheld readers, particularly if the reader employs a multichannel receiver (although such readers may not need processing gain because they often get close enough to an endpoint). A bubble-up transmitter should transmit at less than 10-second intervals for mobile and handheld readers. However, for fixed location readers, then the rate could go up to 1 minute.

The above system works well in the 900 MHz ISM band (or related unlicensed bands) because rules for the band require spreading transmissions across the band. It would be possible with a link margin to overrun a reader with endpoints if the endpoints all transmitted data on the same frequency. Since an endpoint can hop across more than 10 MHz in the ISM band, collisions on any one frequency are minimized. Since processing gain provides a jamming margin, other spread spectrum signals in the band are rejected by the reader.

Overall, embodiments of the invention are generally directed to bubble-up ERTs, where each ERT transmits the same information for a given interval before changing consumption data (i.e., the payload indicating the amount of utility consumption). The embodiments may also be employed with other utility data collection systems.

The above-described embodiment is helpful in recovering after a power outage. After a power outage, the system may suffer from an "avalanche effect," where each endpoint sends back a signal indicating when the power went off. Under the above embodiment, the receiver gathers sufficient information from those endpoints that are near to the receiver first because the reader receives and integrates a sufficient number of packets from the nearby endpoints first for a proper decode. Thereafter, the reader receives and integrates a sufficient number of packets from endpoints at a next greater radius, and so on.

By knowing the hopping pattern and timing of endpoints, the reader can miss some transmissions from an endpoint, but find it again by going to the next channel at the right time. This allows the reader to continue to integrate packets that can be correlated, and skip packets that cannot, which further enhances system performance.

Further information on AMR and related systems may be found in the following commonly assigned U.S. Patent Applications: U.S. patent application Ser. No. 60/500,507, filed on Sep. 5, 2003, entitled "System and Method for Fast Detection of Specific On-Air Data Rate;" U.S. patent application Ser. No. 60/500,515, filed Sep. 5, 2003, entitled "System and Method for Mobile Demand Reset;" U.S. patent application Ser. No. 60/500,504, filed Sep. 5, 2003, entitled "System and Method for Optimizing Contiguous Channel Operation with Cellular Reuse;" U.S. patent application Ser. No. 60/500,479, filed Sep. 5, 2003, entitled "Synchronous Data Recovery System;" U.S. patent application Ser. No. 60/500,550, filed Sep. 5, 2003, entitled "Data Communication Protocol in an Automatic Meter Reading System;" U.S. patent application Ser. No. 10/655,760, filed on Sep. 5, 2003, entitled "Synchronizing and Controlling Software Downloads, such as for Components of a Utility Meter-Reading System;" and U.S. patent application Ser. No. 10/655,759, filed on Sep. 5, 2003, entitled "Field Data Collection and Processing System, such as for Electric, Gas, and Water Utility Data."

CONCLUSION

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily the automatic meter-reading system described herein. The elements and acts of the various embodiments described above can be combined to provide further embodiments and some steps may be deleted, moved, added, subdivided, combined, and/or modified. Each of these steps may be implemented in a variety of different ways. Also, while these steps are shown as being performed in series, these steps may instead be performed in parallel, or may be performed at different times.

While specific data structures are described herein, any type of data structure can be employed. For example, relevant data can have preceding headers, or other overhead data preceding (or following) the relevant data. Alternatively, relevant data can avoid the use of any overhead data, such as headers, and simply be recognized by a certain byte or series of bytes within a serial data stream. Any number of data structures and types can be employed herein.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above Detailed Description using the singular or plural number may also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The teachings of the invention provided herein can be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of protocols, data models, and processing schemes may vary considerably in its implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

It is claimed:

1. A wireless communication system for processing utility consumption data, the system comprising:
    multiple transmitting nodes, each configured to wirelessly transmit a substantially similar message multiple times and according to one of multiple different frequency hopping tables, wherein each of the transmitting nodes receives utility consumption data from an associated utility meter; and
    a mobile receiving node configured to wirelessly receive at least one of the transmitted messages on one frequency from one of the transmitting nodes, and to perform a first routine at least twice to determine which one of the multiple different frequency hopping tables the one transmitting node is employing, wherein the routine includes:
        guessing a next frequency on which the one transmitting node will next transmit a message, and
        listening at the next frequency for the next transmission of a message, and
    wherein the mobile receiving node wirelessly receives and stores at least two of the transmitted messages after determining the one frequency hopping table employed by the one transmitting node, and wherein the receiving node performs a second routine to decode the at least two received and stored messages, wherein the second routine comprises:
        applying a mathematical operation to the two received and stored messages to produce an improved message, and
        decoding at least a portion of the improved message.

2. The method of claim 1 wherein the mobile receiving node performs a third routine, before the second routine, wherein the third routine comprises:
    determining a time gap between pairs of received messages to determine at least first and second differing time gaps;
    comparing the first and second differing time gaps to multiple time dithering tables to identify one of the tables having the first and second differing time gaps; and
    identifying the one transmitting node, at least in part, on the identified table.

3. A wireless communication method between a transmitting node and a receiving node, the method comprising:
    at the transmitting node, wirelessly transmitting messages according to one of multiple different frequency hopping tables, wherein the transmitting node is associated with a utility meter for gathering data associated with consumption of a utility, and wherein at least some of the transmitted messages contain data associated with consumption of a utility; and
    at the receiving node, wirelessly receiving at least one of the transmitted messages on one frequency and performing a routine at least twice to determine which of the multiple different frequency hopping tables the transmitting node is employing, wherein the routine includes:
        guessing a next frequency on which the transmitting node will next transmit a message, and
        listening at the next frequency for the next transmission of a message to determine which of the multiple different frequency hopping tables the transmitting node is employing.

4. The method of claim 3, further comprising listening on a hailing channel before guessing the next frequency.

5. The method of claim 3 wherein the receiving node includes a multi-channel receiver, and wherein the method further comprises wirelessly receiving signals on multiple frequencies substantially simultaneously.

6. The method of claim 3, further comprising:
    determining a time gap between pairs of received messages to determine at least first and second differing time gaps;
    comparing the first and second differing time gaps to multiple time dithering tables to identify one of the tables having the first and second differing time gaps; and
    identifying the transmitting node, at least in part, on the identified table.

7. The method of claim 3, further comprising:
    determining first and second time differences between two different pairs of received messages; and identifying the transmitting node, at least in part, on the determined first and second time differences.

8. A computer-readable medium whose contents cause at least one mobile wireless receiver to perform a method to determine an identity of one of multiple transmitting nodes, and wherein each of the multiple transmitting nodes wirelessly transmit messages according to one of multiple different frequency hopping tables, the method comprising:

wirelessly receiving at least one of the transmitted messages on one frequency and performing a routine at least twice to determine which of the multiple different frequency hopping tables the one transmitting node is employing, wherein each of the multiple transmitting nodes are associated with a respective one utility meter that gathers utility consumption data, and wherein at least some of the transmitted messages contain utility consumption data;

guessing a next frequency on which the one transmitting node will next transmit a message; and listening at the next frequency for the next transmission of a message to determine the identity of the one transmitting nodes from an identified one of multiple different frequency hopping tables the one transmitting node is employing.

9. The computer-readable medium of claim 8 wherein the computer-readable medium is a memory of a mobile wireless utility data collection device.

10. The computer-readable medium of claim 8 wherein the computer-readable medium is a logical node in a computer network receiving the contents.

11. The computer-readable medium of claim 8 wherein the computer-readable medium is a computer-readable disk.

12. The computer-readable medium of claim 8 wherein the computer-readable medium is a data transmission medium carrying a generated data signal containing the contents.

13. The computer-readable medium of claim 8 wherein the computer-readable medium is a memory of a computer system.

14. The computer-readable medium of claim 8, further comprising:

determining first and second time differences between two different pairs of received messages; and identifying the transmitting node, at least in part, on the determined first and second time differences.

* * * * *